(12) United States Patent
Collins

(10) Patent No.: US 9,653,971 B2
(45) Date of Patent: May 16, 2017

(54) SPEED DETECTION CIRCUITS FOR PERMANENT MAGNET ALTERNATORS

(71) Applicant: Hamilton Sundstrand Corporation, Charlotte, NC (US)

(72) Inventor: Mark J. Collins, Windsor Locks, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 647 days.

(21) Appl. No.: 14/226,384

(22) Filed: Mar. 26, 2014

(65) Prior Publication Data
US 2015/0280528 A1    Oct. 1, 2015

(51) Int. Cl.
| | |
|---|---|
| *H02K 29/14* | (2006.01) |
| *H02P 6/16* | (2016.01) |
| *H02K 19/36* | (2006.01) |
| *H02K 11/21* | (2016.01) |
| *H02P 6/17* | (2016.01) |
| *H02P 9/00* | (2006.01) |
| *H02P 9/30* | (2006.01) |

(52) U.S. Cl.
CPC .............. *H02K 11/21* (2016.01); *H02K 19/36* (2013.01); *H02K 29/14* (2013.01); *H02P 6/17* (2016.02); *H02P 9/009* (2013.01); *H02P 6/16* (2013.01); *H02P 9/305* (2013.01)

(58) Field of Classification Search
CPC .... H02P 6/17; H02P 6/16; H02P 9/305; H02P 9/009; H02P 9/04; H02K 11/21; H02K 27/20; H02K 29/14; H02K 19/36
USPC ........ 290/40 A; 310/68 B, 68 R, 68 C, 68 D; 318/146; 324/160, 161
See application file for complete search history.

(56) References Cited

U.S. PATENT DOCUMENTS 7,586,204 B2 *   9/2009   Hess .......................... H02P 9/48
                                                           290/40 A

FOREIGN PATENT DOCUMENTS

GB            2456672 A        7/2009

OTHER PUBLICATIONS

UK Search Report for application No. GB2456672 Dated Oct. 29, 2015.

* cited by examiner

*Primary Examiner* — Terrance Kenerly
*Assistant Examiner* — Alexander Singh
(74) *Attorney, Agent, or Firm* — Locke Lord LLP; Scott D. Wofsy; Christopher J. Cillié

(57) ABSTRACT

A permanent magnet alternator (PMA) includes a rotatable shaft, windings, a shunt regulator circuit, and a speed detection circuit. The rotatable shaft is connected electromagnetically to the windings. The shunt regulator circuit is electrically connected to the windings. A current sense transformer with a primary coil is electrically connected to the shunt regulator circuit. A secondary coil is electrically connected to a comparator circuit with reference voltage and generates voltage pulse indicating PMA speed. The voltage pulses form an output corresponding to and indicative of rotation speed of the shaft suitable for processing by a processor to present a PMA speed indication for use in the overall system architecture as a measurement parameter.

15 Claims, 2 Drawing Sheets

SPEED DETECTION CIRCUITS FOR PERMANENT MAGNET ALTERNATORS

BACKGROUND OF THE INVENTION

1. Field of the Invention

The present disclosure relates to speed detection for rotating machines, and more particularly to permanent magnet alternator speed detection using current sense transformers.

2. Description of Related Art

Permanent magnet alternators are used in mechanical systems with moving components that can be manipulated to generate electrical power. For example, a three-phase electrical system can be derived from a rotating engine component or shaft to which a rotor of a permanent magnet alternator (PMA) is attached. The three-phase voltage source can be rectified and filtered to create a useable voltage bus for use by on board electronics.

In some applications, there is a need to monitor the speed of the associated mechanical component used to generate the electrical power. For example, the required speed to be monitored could be engine speed on an aircraft. Conventional speed detection for permanent magnet alternators has been done using diode detection circuitry. Diode detection circuitry generally provides output with a relatively low signal to noise ratio and a relatively low voltage detection level (e.g. less than about 1 volt). This can make such circuitry difficult to reliably implement in high current environments. Moreover, in some systems, the need for electrical isolation may require additional electrical components, such as optical isolators for example.

Such conventional methods and systems have generally been considered satisfactory for their intended purpose. However, there is a need in the art for speed detection devices for permanent magnet alternators with improved reliability. The present disclosure provides solutions to this need.

SUMMARY OF THE INVENTION

A permanent magnet alternator includes a shaft, alternator windings, a shunt regulator circuit, a current sense transformer, and a speed detection circuit. A permanent magnet is connected to the shaft and is rotatable with respect to the alternator windings. The alternator windings are electrically connected to the shunt regulator circuit. The shunt regulator circuit is connected to the speed detection circuit through primary and secondary coils of the current sense transformer. The coils of the current sense transformer connect the shunt regulator circuit and the speed detection circuit such that a voltage indicative of shaft rotational speed is created in the speed detection circuit from current returning to a winding of the permanent magnet alternator in the shunt regulator circuit.

In certain embodiments, the connection between the speed detection circuit and the shunt regulator circuit includes an electromagnetic coupling. The shunt regulator circuit can include a current reverse flow leg electrically connected to a winding of the permanent magnet alternator for returning current to the winding as rotation of the shaft successively induces current in other alternator windings. The current sense transformer primary coil can be electrically connected to the reverse flow leg, the current sense transformer secondary coil can be electrically connected to the speed detection circuit, and electromagnetic coupling can couple the primary coil to the secondary coil such that current flow through the reverse flow leg induces current flow in the speed detection circuit. It is contemplated that secondary coil can have a greater number of turns than the primary coil. The primary coil can have a single turn.

In accordance with certain embodiments, the speed detection circuit includes a comparator. A first input of the comparator can be electrically connected to the current sense transformer secondary coil. A reference voltage source can be electrically connected to a second input of the comparator. The comparator can be configured such that, when voltage across the sense resistor exceeds the reference source voltage, an output of the comparator forms a voltage edge indicative of shaft speed. It is contemplated that the speed detection circuit can include a sense resistor with a first end electrically connected between the comparator and the current sense transformer secondary coil. A second end of the sense resistor can be electrically connected to a ground terminal. The sense resistor can have a resistance of about 25 ohms, for example.

It is also contemplated that in certain embodiments the speed detection circuit includes a capacitor. A first end of the capacitor can be electrically connected between the sense resistor first end and current sense transformer secondary coil. A second end of the capacitor can be electrically connected to the ground terminal. A diode can be electrically connected between the capacitor first end and current sense transformer secondary coil for opposing current flow towards the secondary coil through the diode.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
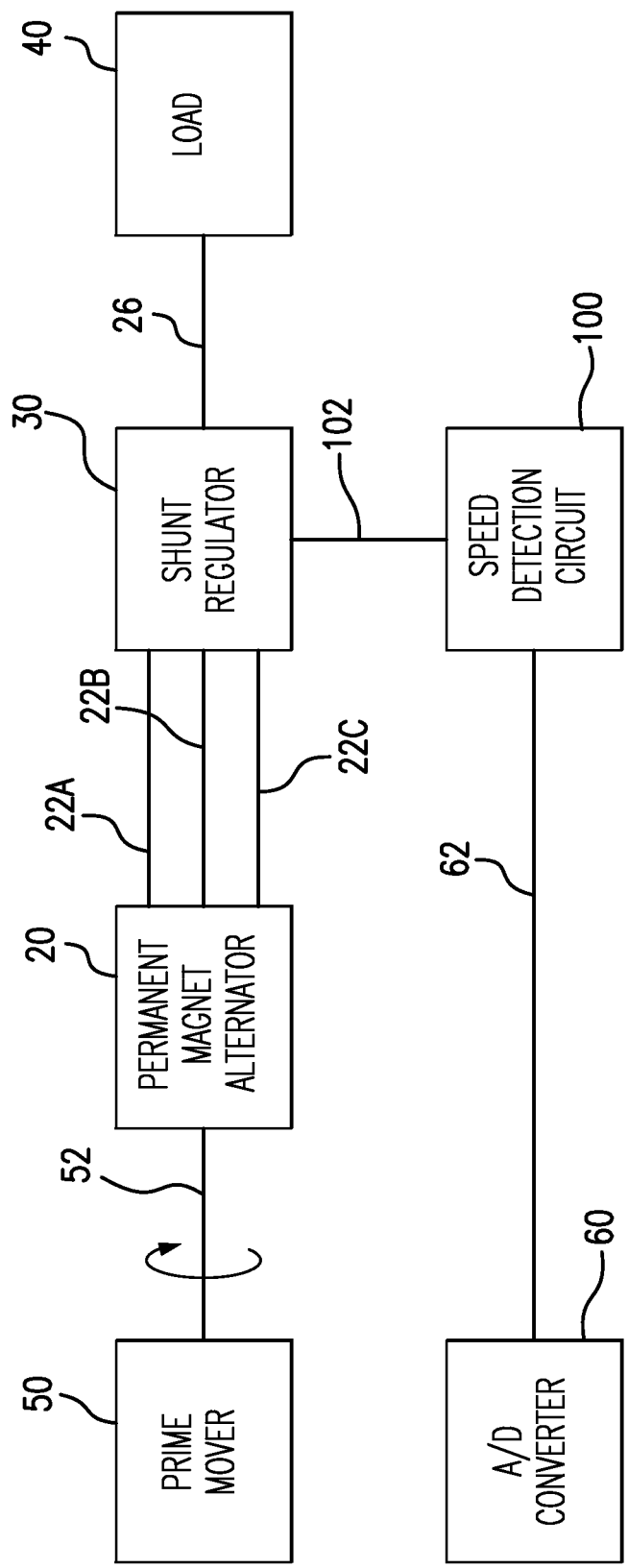
FIG. 1 is a schematic view of an exemplary embodiment of a power bus in accordance with the present disclosure, showing a permanent magnet alternator connected to a shunt regulator and a speed detection circuit.

Reference will now be made to the drawings wherein like reference numerals identify similar structural features or aspects of the subject disclosure. For purposes of explanation and illustration, and not limitation, a schematic view of an exemplary embodiment of a speed detection circuit in accordance with the disclosure is shown in FIG. 1 and is designated generally by reference character 100. Other embodiments of speed detection circuits in accordance with the disclosure, or aspects thereof, are provided in FIG. 2, as will be described. The systems and methods described herein can be used for measuring rotor speed in permanent magnet alternators, such as in aircraft electrical systems.

With reference to FIG. 1, an electrical system 10 is shown. Electrical system 10 includes a permanent magnet alternator 20, a shunt regulator circuit 30, and an electrical load 40. A prime mover 50 is operatively associated with permanent magnet alternator 20 through a shaft 52. Shaft 52 is operatively associated a rotor with a permanent magnet of permanent magnet alternator 20 and configured for rotating the magnet in relation to first, second, and third phase windings 24A, 24B, and 24C (shown in FIG. 2). This induces current flow in phase windings 24 that varies as a function of rotational speed and position of shaft 52.

First, second, and third phase leads 22A, 22B, and 22C electrically connect first, second, and third phase windings 24A, 24B, and 24C (shown in FIG. 2) to shunt regulator circuit 30. Shunt regulator circuit 30 is configured and operative for converting three-phase alternating current received through first, second, and third phase leads 22A, 22B, and 22C into single-phase current suitable for powering electrical load 40.

Speed detection circuit 100 connects to shunt regulator circuit 30 through an electromagnetic coupling 102 and is configured to generate a voltage having information indicative of rotation of a rotary portion of permanent magnet alternator 20. An analog to digital converter 60 is electrically connected to speed detection circuit 100 through a comparator output lead 62 and is configured to convert voltage received from speed detection circuit 100 having information indicative of rotation of the rotary portion of permanent magnet alternator 20 into input suitable for use by an aircraft control architecture.

Figure 2:
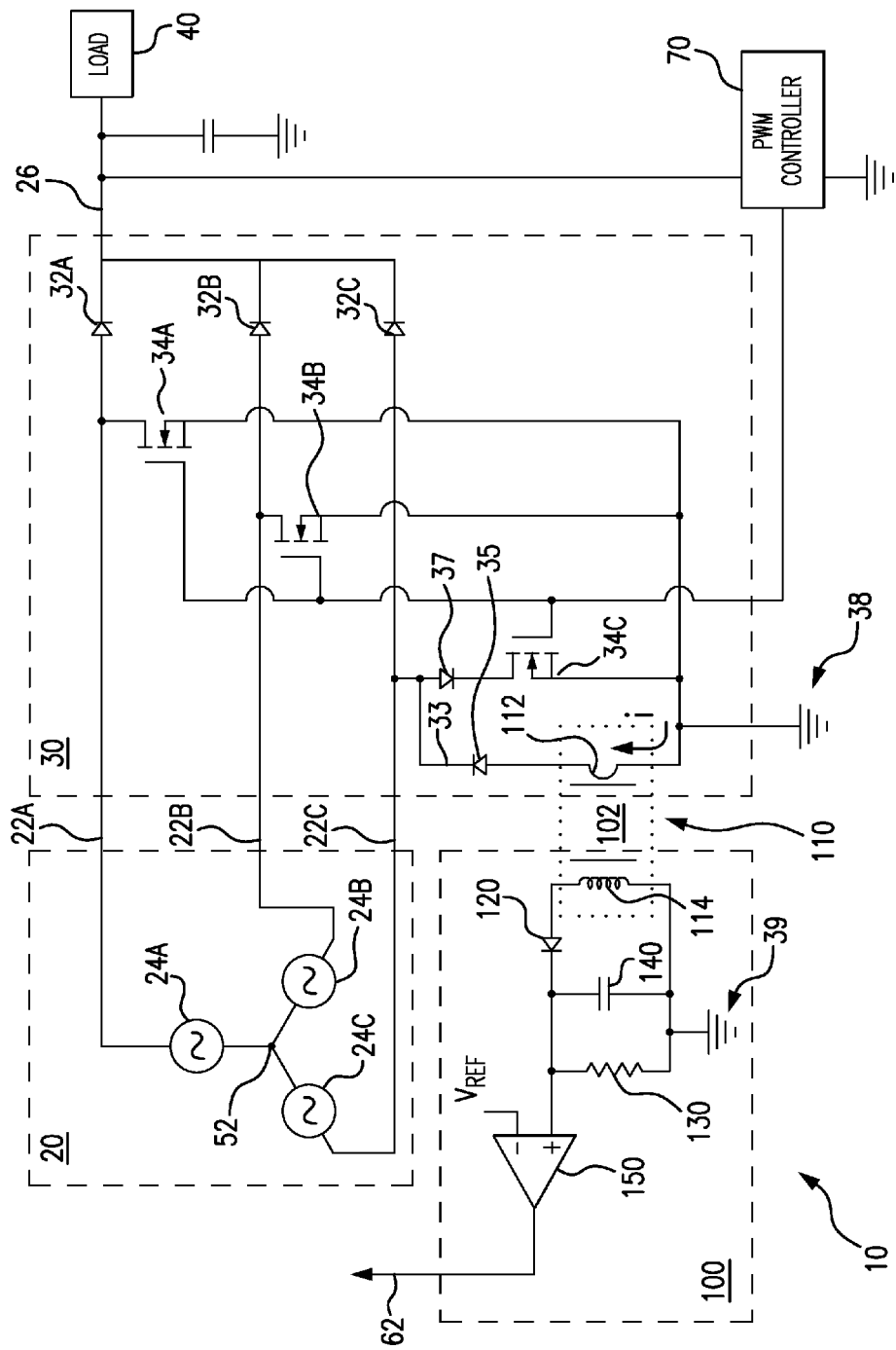
FIG. 2 is a circuit diagram of the power bus of FIG. 1, showing circuitry of the shunt regulator and the speed detection circuit.

With reference to FIG. 2, a circuit diagram of electrical system 10 is shown. Permanent magnet alternator 20 includes a first phase winding 24A, a second phase winding 24B, and a third phase winding 24C. First phase lead 22A is electrically connected to first phase winding 24A, second phase lead 22B is electrically connected to second phase winding 24B, and third phase lead 22C is electrically connected to third phase winding 24C.

Shunt regulator circuit 30 includes a first, second, and third phase diode 32A, 32B, and 32C. Shunt regulator circuit also includes a first, second, and third MOSFET 34A, 34B, and 34C. First, second, and third phase diodes 32A, 32B, and 32C are electrically connected between phase windings 24A, 24B and 24C, respectively, and electrical load 40. First, second, and third phase diodes 32A, 32B, and 32C are configured for allowing current flow from respective phase windings to electrical load 40 and opposing current flow from electrical load 40 to first, second, and third phase windings 24A, 24B, and 24C, respectively.

As illustrated, first, second, and third MOSFETs 34A, 34B, and 34C are n-channel MOSFETs that respectively include a source terminal, a drain terminal, and a control terminal. The drain terminal of first MOSFET 34A connects to first winding 24A through first phase lead 22A and the source terminal of first MOSFET 34A connects to a first ground terminal 38. The drain terminal of second MOSFET 34B connects to second winding 24B through second phase lead 22B and the source terminal of second MOSFET 34B connects to first ground terminal 38. The drain terminal of third MOSFET 34C connects to third winding 24C through third phase lead 22C and the source terminal of third MOSFET 34C connects to first ground terminal 38. As will appreciated, embodiments of shunt regulator 30 can include one or more p-channel MOSFETs and remain within the scope of the present disclosure.

A pulse width modulation controller 70 is electrically connected between bus segment 26 and control terminals of first, second, and third MOSFETs 34A, 34B, and 34C. Pulse width modulation controller 70 is configured for applying a control voltage to the control terminals of the first, second, and third MOSFETs 34A, 34B, and 34C based on current flow (draw) through bus segment 26. As current flow varies through bus segment 26 in response to the needs of electrical load 40, pulse width modulation controller 70 alters current applied to the control terminals of first, second and third MOSFETs 34A, 34B, and 34C. This regulates current flow through bus segment 26 by shunting to first ground terminal 38 current generated by permanent magnet alternator 20 that is not required by electrical load 40.

A reverse flow leg 33 electrically connects to third phase winding 24C on a first end, and source terminals of first, second, and third MOSFETs 34A, 34B, and 34C as well as first ground terminal 38 on an opposite end. A first blocking diode 35 is electrically connected to reverse flow leg 33 and is configured for opposing current flow from third phase winding 24C through reverse flow leg 33 (toward first ground terminal 38). First blocking diode 35 also allows reverse flow current to return (indicated with arrow i) from first, second, and third phase leads 22A, 22B, and 22C to third phase winding 24C through reverse flow leg 33. A second blocking diode 37 is electrically connected between third MOSFET 34C and third phase lead 22C, and is configured for opposing current flow from first and second phase leads 22A and 22B flowing to third phase lead 22C through third MOSFET 34C.

Speed detection circuit 100 includes a current sense transformer 110 (shown in dotted outline in FIG. 2) with a primary coil 112 and a secondary coil 114, a diode 120, a sense resistor 130, a capacitor 140, and a comparator 150. Primary coil 112 is electrically connected to reverse flow leg 33 between first ground terminal 38 and first blocking diode 35. Secondary coil 114 is electrically isolated from primary coil 112 and is electrically connected to a second ground terminal 39. Sense resistor 130 includes a first end electrically connected between comparator 150 and secondary coil 114, and a second end electrically connected to second ground terminal 39. Capacitor 140 includes a first end electrically connected to between the first end of sense resistor 130 and secondary coil 114, and a second end electrically connected to second ground terminal 39. Diode 120 is arranged between the first end of capacitor 140 and secondary coil 114, and is configured for opposing current flow through diode 140 towards secondary coil 114.

Comparator 150 includes first and second inputs and an output and is configured for providing to comparator output lead 62 the higher of voltages applied to a first and second comparator inputs. The first comparator input is electrically connected to secondary coil 114 through diode 120. The second comparator input is connected to a reference voltage source. The comparator output is connected to comparator output lead 62. When voltage associated with current induced in secondary coil 114 exceeds that of the reference voltage, comparator 150 applies voltage applied to the first comparator input to comparator output lead 62. Otherwise comparator 150 applies the reference voltage to output lead 62.

At intervals during rotation of shaft 52, current flows from first ground terminal 38 through reverse flow leg 33 to third lead 22C. This returning current (indicated with current arrow 'i' in FIG. 2) traverses primary coil 112 and alters the strength of electromagnetic coupling 102 extending between primary and secondary coils 112 and 114. This induces a corresponding current flow in secondary coil 114 that is commensurate with current flow in reverse flow leg 33 and which is scaled by the ratio turns in secondary coil 114 to primary coil 112. Since current flow through reverse flow leg 33 is a function of the rotational position of shaft 52, and the rate of flow and ebb in the current in reverse flow leg 33 is indicative of rotational speed of permanent magnet alternator 20, voltage applied to the first input flow of comparator 150 increases and decreases according to current flow and ebb in reverse flow leg 33. In this respect primary coil 112 couples the phase current, i.e. current flowing through reverse flow leg 33, to secondary coil 114 through electromagnetic coupling 102, thereby inducing corresponding current flow in secondary coil 114.

The induced current flows to second ground terminal 39 through sense resistor 130 and applies voltage to the first comparator input corresponding to the magnitude of the induced current flow. Comparator 150 receives the corresponding voltage and compares it to the reference voltage. When the voltage exceeds that of the reference voltage, comparator 150 trips high and applies the higher input voltage to the comparator output. This forms a pulse edge in the voltage applied by comparator 150 to comparator output lead 62 indicative of the rotational speed of permanent magnet alternator rotor. In this way current sense circuit 100 picks up a given phase's return current using current sense transformer 110 and conditions the event into a digital level pulse applied to comparator output lead 62, thereby providing output suitable for by speed analysis circuitry to make system level computations needed for a given operational plant, such as for an aircraft engine controller for example. As will be appreciated, secondary winding 114 is isolated from primary coil 112 (carrying phase current). This allows for operation in an isolated ground system without the need for specialized isolation equipment, such as optical isolators for example.

Secondary coil 114 is scaled for comparator 150 through the ratio of turns of secondary coil 114 to turns of primary coil 112 such that voltage in speed detection circuit 100 is linear over the operating frequency range of PMA 20. Sense resistor 130 is correspondingly scaled with the turn ratio of the current sense transformer to achieve sensing levels high enough not to be affected by background noise. As will be appreciated, the accuracy of the current measurement in the phase is not important (the usual use for current sense transformers), just the detection of the current passing back through the phase selected for speed detection. In embodiments, the ratio of secondary coil turns to primary coil turns is about 150:1, the secondary coil has 114 turns, primary coil 112 has a single turn, and sense resistor is a low power resistor with a resistance of about 25 ohms.

The methods and systems of the present disclosure, as described above and shown in the drawings, provide for speed detection circuits with superior properties including improved accuracy and/or reduced sensitivity to noise. The circuit topology illustrated can also provide primary secondary transformer isolation as reverse flow leg 33 is not electrically connected to secondary coil 114. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A permanent magnet alternator, comprising:
  a rotatable shaft electromagnetically connected to windings;
  a shunt regulator circuit connected to the windings;
  a speed detection circuit connected to the shunt regulator by a current sense transformer having a primary coil and a secondary coil, wherein the primary coil is electrically connected to the to the shunt regulator, and wherein the secondary coil is electrically connected to the speed detection circuit for generating voltage pulses corresponding to and indicative of shaft rotation speed using current returning to the windings through the shunt regulator circuit.

2. An alternator as recited in claim 1, wherein the speed detection circuit is electromagnetically coupled to the shunt regulator circuit through the current sense transformer.

3. An alternator as recited in claim 1, wherein the shunt regulator circuit further includes a reverse flow leg coupled to one of the windings, wherein the primary coil of current sense transformer is electrically connected to the reverse flow leg.

4. An alternator as recited in claim 1, wherein the primary coil of the current sense transformer has a single turn.

5. An alternator as recited in claim 1, wherein the secondary coil of the current sense transformer has a plurality of turns.

6. An alternator as recited in claim 1, wherein the ratio of secondary coil turns to primary coil turns is about 150:1.

7. An alternator as recited in claim 1, further including a comparator electrically connected to the secondary coil.

8. An alternator as recited in claim 7, further including a filter electrically connected between the comparator and secondary coil and configured and operative to filter current induced in the secondary coil and received by the comparator.

9. An alternator as recited in claim 7, further including a reference voltage source electrically connected to the comparator.

10. An alternator as recited in claim 7, further including a sense resistor with first and second ends, wherein the sense resistor first end connects between the comparator and the secondary coil, wherein the sense resistor second end connects to a ground terminal.

11. An alternator as recited 10, wherein the resistance of the sense resistor and ratio of secondary coil to primary coil turns is scaled to the current output of the permanent magnet alternator windings.

12. An alternator as recited in claim 10, wherein the sense resistor has a resistance of about 25 ohms.

13. An alternator as recited in claim 12, further including a rectifying diode arranged between the capacitor first end and secondary coil, wherein the diode is configured for opposing current flow from the capacitor to the secondary coil.

14. An alternator as recited in claim 10, further including a capacitor with first and second ends, wherein capacitor first end connects between the sense resistor first end and the secondary coil, wherein the capacitor second end connects to the ground terminal.

15. A speed detection circuit for a permanent magnet alternator, comprising:
  a shunt regulator circuit including:
    a first lead connected to a first ground through a first MOSFET;
    a second lead connected to a second ground through a second MOSFET; and
    a reverse flow leg having a first end and a second end, wherein the first end is connected between the second MOSFET and the second lead, wherein the second end is connected to the first ground; and
  a speed detection circuit including a current sense transformer with a primary coil and a secondary coil,
  wherein the primary coil is connected to the first ground and second lead through the reverse flow leg, and wherein the secondary coil is electromagnetically coupled to the primary coil and electrically connected to a second ground for generating voltage pulses corresponding to and indicative of shaft rotation speed using current returning to the second lead through the shunt regulator circuit.

\* \* \* \* \*